(12) United States Patent
Cha

(10) Patent No.: US 10,199,686 B2
(45) Date of Patent: Feb. 5, 2019

(54) ORGANIC ELECTROLYTIC SOLUTION AND LITHIUM BATTERY INCLUDING THE SAME

(71) Applicant: Samsung SDI Co., Ltd., Yongin-si, Gyeonggi-do (KR)

(72) Inventor: Siyoung Cha, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 502 days.

(21) Appl. No.: 15/067,827

(22) Filed: Mar. 11, 2016

(65) Prior Publication Data

US 2016/0268635 A1 Sep. 15, 2016

(30) Foreign Application Priority Data

Mar. 12, 2015 (KR) ........................ 10-2015-0034489

(51) Int. Cl.
*H01M 10/0567* (2010.01)
*H01M 10/052* (2010.01)
*H01M 10/0568* (2010.01)

(52) U.S. Cl.
CPC ..... *H01M 10/0567* (2013.01); *H01M 10/052* (2013.01); *H01M 10/0568* (2013.01); *H01M 2300/004* (2013.01); *Y02T 10/7011* (2013.01)

(58) Field of Classification Search
None
See application file for complete search history.

(56) References Cited

U.S. PATENT DOCUMENTS 3,689,438 A 9/1972 Bourat et al.
2009/0197167 A1 8/2009 Okschimke
(Continued)

FOREIGN PATENT DOCUMENTS

KR 10-2014-0104383 A 8/2014
KR 10-2015-0033445 A 4/2015

OTHER PUBLICATIONS

Compound Summary for CID 248367, *PubChem/Open Chemistry Database*, NIH, U.S. National Library of Medicine, National Center for Biotechnology Information, Created Mar. 26, 20015, Modified Apr. 25, 2015, 11 pages.
(Continued)

*Primary Examiner* — Sarah A. Slifka
(74) *Attorney, Agent, or Firm* — Knobbe, Martens, Olson & Bear, LLP

(57) ABSTRACT

An organic electrolytic solution includes: a lithium salt; an organic solvent; a disultone-based compound represented by Formula 1; and a silicon-based compound represented by Formula 2:

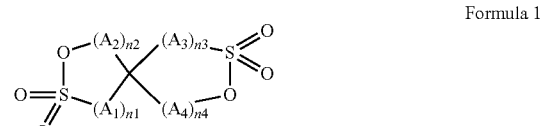

Formula 1

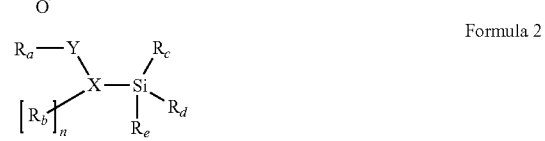

Formula 2 wherein in Formulae 1 and 2,
$A_1$, $A_2$, $A_3$, and $A_4$ are each independently selected from a substituted or unsubstituted C1 to C5 alkyl group; a carbonyl group; or a sulfinyl group,
n1 to n4 each are independently an integer from 1 to 3, when each of n1 to n4 is 2 or more, a plurality of $A_1$, $A_2$, $A_3$, or $A_4$ are identical or different,
X is N or O, and n is 0 or 1, when X is O, n is 0,
(Continued)

Y is a covalent bond, a carbonyl group, or —N=C($R_f$)—, and $R_a$, $R_b$, $R_c$, $R_d$, and $R_e$ are the same as described in the detailed description.

20 Claims, 3 Drawing Sheets

(56) References Cited

U.S. PATENT DOCUMENTS

| | | |
|---|---|---|
| 2010/0248041 A1 | 9/2010 | Kikuchi et al. |
| 2011/0183218 A1 | 7/2011 | Odani et al. |
| 2012/0220785 A1 | 8/2012 | Bouteiller |
| 2012/0258357 A1 | 10/2012 | Kim |
| 2012/0288769 A1 | 11/2012 | Kono et al. |
| 2013/0177818 A1 | 7/2013 | Han et al. |
| 2014/0272604 A1 | 9/2014 | Lim et al. |
| 2015/0010811 A1 | 1/2015 | Egorov et al. |
| 2015/0086861 A1 | 3/2015 | Makhmut et al. |

OTHER PUBLICATIONS

Goethals et al., "The Disultone of 2.2-Dihydroxymethyl-1.3-Propane Disulphonic Acid," *Bull. Soc. Chim. Belg.*, 70, 1961, p. 218-220.

ORGANIC ELECTROLYTIC SOLUTION AND LITHIUM BATTERY INCLUDING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of Korean Patent Application No. 10-2015-0034489, filed on Mar. 12, 2015, in the Korean Intellectual Property Office, the disclosure of which is incorporated herein in its entirety by reference.

BACKGROUND

Field

This disclosure relates to an organic electrolytic solution and a lithium battery including the organic electrolytic solution.

Description of the Related Technology

Lithium batteries are used as a driving force for portable electronic devices, such as video cameras, mobile phones, or notebook computers. Rechargeable lithium secondary batteries have, per unit weight, an energy density that is at least three times as high as that of a lead storage battery, a nickel-cadmium battery, a nickel hydrogen battery, and a nickel zinc battery, and are chargeable at high speed.

Lithium batteries are operated at a high driving voltage, and accordingly, an aqueous electrolytic solution, which is highly reactive to lithium, may not be used therefor. In general, lithium batteries use an organic electrolytic solution, which is prepared by dissolving a lithium salt in an organic solvent. The organic solvent may have stability at high voltage, high ion conductivity, high permittivity, and low viscosity.

When an organic electrolytic solution including a lithium salt is used in a lithium battery, irreversible side reactions may occur between the organic electrolytic solution and an anode and/or a cathode. Due to the side reactions, lifespan characteristics and high-temperature stability of a lithium battery may decrease.

Accordingly, there is a need to develop an organic electrolytic solution that provides a lithium battery having improved lifespan characteristics and high-temperature stability.

SUMMARY

Some embodiments include an organic electrolytic solution for a lithium battery.

Some embodiments include a lithium battery including the organic electrolytic solution.

Additional aspects will be set forth in part in the description which follows and, in part, will be apparent from the description, or may be learned by practice of the presented embodiments.

In some embodiments, an organic electrolytic solution includes a lithium salt; an organic solvent; and a disultone-based compound represented by Formula 1; and a silicon-based compound represented by Formula 2:

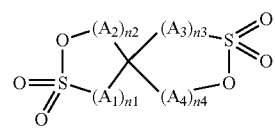

FORMULA 1

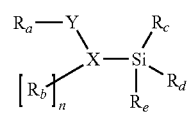

FORMULA 2 wherein in Formulae 1 and 2, $A_1$, $A_2$, $A_3$, and $A_4$ are each independently selected from a substituted or unsubstituted C1 to C5 alkyl group; a carbonyl group; or a sulfinyl group, n1 to n4 are each independently an integer from 1 to 3, when each of n1 to n4 is 2 or more, a plurality of $A_1$, $A_2$, $A_3$, or $A_4$ may be identical or different, X is N or O, and n is 0 or 1, and when X is O, n is 0, Y may be a covalent bond, a carbonyl group, or —N=C($R_f$)—, $R_a$ and $R_b$ are each independently a hydrogen; a halogen-substituted or unsubstituted C1 to C10 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C10 alkenyl group; a halogen-substituted or unsubstituted C2 to C10 alkynyl group; a halogen-substituted or unsubstituted C1 to C10 alkoxy group; a halogen-substituted or unsubstituted C1 to C10 alkylamine group; or —Si($R_g$)($R_h$)($R_i$), wherein $R_g$, $R_h$ and $R_i$ may be each independently a halogen-substituted or unsubstituted C1 to C10 alkyl group, $R_c$, $R_d$, $R_e$, and $R_f$ may be each independently a hydrogen; a halogen-substituted or unsubstituted C1 to C10 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C10 alkenyl group; or a halogen-substituted or unsubstituted C2 to C10 alkynyl group, and $R_a$ and $R_b$ may link to each other to form a ring.

In some embodiments, a lithium battery includes: a cathode; an anode; and the organic electrolytic solution.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
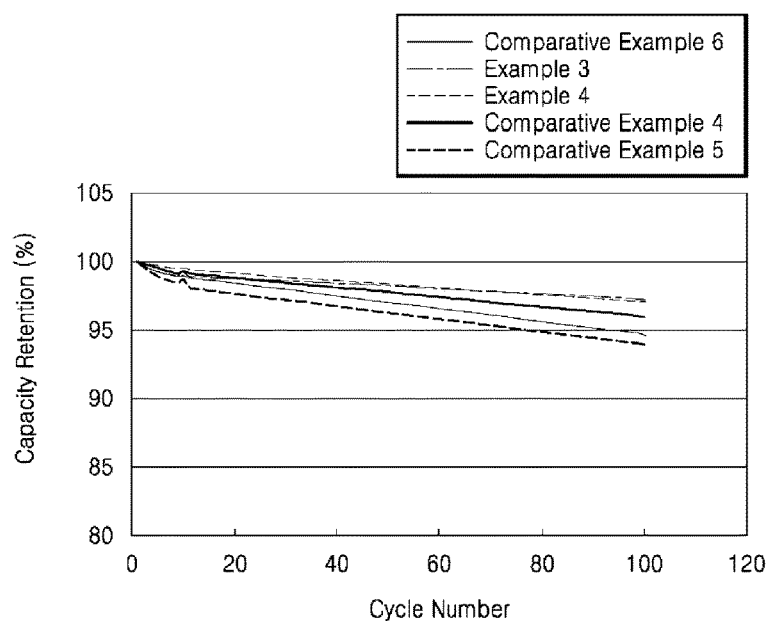
FIG. 1 is a graph showing lifespan characteristics of lithium batteries manufactured according to Examples 3 and 4 and Comparative Examples 4 to 6.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an organic electrolytic solution for a lithium battery according to an exemplary embodiment and a lithium battery including the organic electrolytic solution will be described in detail.

An organic electrolytic solution for a lithium battery according to an exemplary embodiment includes a lithium salt; an organic solvent; a disultone-based compound represented by Formula 1; and a silicon-based compound represented by Formula 2:

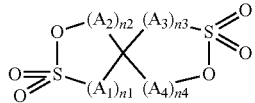

Formula 1

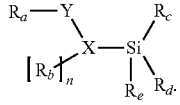

Formula 2

In the Formulae 1 and 2, $A_1$, $A_2$, $A_3$, and $A_4$ are each independently selected from a substituted or unsubstituted C1 to C5 alkyl group, a carbonyl group, or a sulfinyl group, n1 to n4 are each independently an integer from 1 to 3, and when each of n1 to n4 is 2 or more, a plurality of $A_1$, $A_2$, $A_3$, or $A_4$ may be identical or different, X is N or O, and n is 0 or 1, and when X is O, n is 0, —Y is a covalent bond, a carbonyl group, or —N=C($R_f$)—, Ra and Rb are each independently selected from a hydrogen; a halogen-substituted or unsubstituted C1 to C10 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C10 alkenyl group; a halogen-substituted or unsubstituted C2 to C10 alkynyl group; a halogen-substituted or unsubstituted C1 to C10 alkoxy group; a halogen-substituted or unsubstituted C1 to C10 alkylamine group; or —Si($R_g$)($R_h$)($R_i$), wherein $R_g$, $R_h$, and $R_i$ each are independently a halogen-substituted or unsubstituted C1 to 10 alkyl group, $R_c$, $R_d$, $R_e$ and $R_f$ may be each independently a hydrogen; a halogen-substituted or unsubstituted C1 to C10 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C10 alkenyl group; or a halogen-substituted or unsubstituted C2 to C10 alkynyl group, and $R_a$ and $R_b$ may link to each other to form a ring.

A disultone-based compound and a silicon-based compound may be added to an electrolytic solution for a lithium battery to increase lifespan characteristics and high-temperature stability of a lithium battery. In the disultone-based compound, two sultone rings are connected in a spiro form.

The effect on the performance of a lithium battery wherein the disultone-based compound and the silicon-based compound are added to an electrolytic solution will now be described in detail. However, these descriptions are provided herein for illustrative purpose only, and do not limit the scope of the disclosure.

In general, during charging and discharging of a lithium battery, an irreversible reaction occurs using excess charge occurs and as a result a passivation layer, such as a solid electrolyte interface (SEI) layer, is formed on the surface of an anode. During charging and discharging, the resulting SEI layer prevents decomposition of an electrolytic solution and acts as an ion tunnel. When the SEI layer has higher stability and lower resistance, a lithium battery may have a longer lifespan. The irreversible reaction may also contribute to the formation of a protection layer on the surface of a cathode. The protection layer may prevent decomposition of an electrolytic solution during charging and discharging and may act as an ion tunnel. When the protection layer has improved stability at high temperature, the lifespan of a lithium battery may be improved.

Meanwhile, during charging, the sulfonate ester moiety in the disultone-based compound is reduced by receiving electrons from the surface of the anode, or reacts with polar solvent molecules that have been reduced, affecting properties of the SEI layer formed on the surface of the anode. For example, the disultone-based compound having the sulfonate ester may more easily receive electrons from an anode, compared to a polar solvent. Therefore, the disultone-based compound is reduced at a lower voltage than a polar solvent, and is reduced before the polar solvent. In other words, due to the inclusion of the sulfonate ester, the disultone-based compound may be more easily reduced and/or decomposed into a radical and/or ion during charging. As a result, the radical and/or ion are combined with lithium ions to form a SEI layer on an anode thus preventing formation of decomposition products of a solvent. For example, the disultone-based compound may covalently bond to either various groups on the surface of a carbonaceous anode or the carbonaceous anode itself, or may be adsorbed onto the surface of the anode. Due to the bonding and/or adsorption, a modified SEI layer that retains a stable state even after a long period of charging and discharging is formed, compared to a SEI layer that is formed by only an organic solvent and a lithium salt. Additionally, the modified SEI layer may effectively prevent permeation of an organic solvent that solvates lithium ions into the anode during intercalation of lithium ions. Since the modified SEI layer effectively prevents a direct contact between an organic solvent and an anode, reversibility of adsorption/release of lithium ions is improved, and as a result, lifespan characteristics of a battery may be improved.

Also, due to the inclusion of sulfonate ester in the disultone-based compound, the sulfonate ester may coordinate with the surface of a cathode, thereby affecting a protection layer formed on the surface of the cathode. For example, the sulfonate ester may coordinate with a transition metal ion of a cathode active material to form a complex and this results in formation of a modified protection layer that retains a stable state even after a long period of charging and discharging compared to a protection layer that is formed by only an organic solvent and a lithium salt. Additionally, the modified protection layer may effectively prevent permeation of an organic solvent that solvates lithium ions into the cathode during intercalation of lithium ions. Since the modified protection layer effectively prevents a direct contact between an organic solvent and a cathode, reversibility of adsorption/release of lithium ions is improved, and as a result, lifespan characteristics of a battery may be improved.

Also, unlike typical sultone-based compounds, the disultone-based compound has a plurality of rings linked in the spiro form, thereby having a relatively higher molecular weight. Accordingly, the disultone-based compound may be thermally stable. In addition, an internal resistance of a lithium battery may decrease.

As described above, the disultone-based compound may form a SEI layer on the surface of an anode, or a protection layer on the surface of a cathode, and in addition due to the thermal stability of the disultone compounds, high-temperature stability of a lithium battery may be improved.

The silicon-based compound may coordinate with thermal decomposition products of a lithium salt or anions dissociated from a lithium salt in an organic electrolytic solution, thus stabilizing the thermal decomposition products or anions. Due to the stabilization of thermal decomposition products of a lithium salt or anions dissociated from a lithium salt, side reactions of the thermal decomposition products and the anions with the organic electrolytic solution may be suppressed. As a result, lifespan characteristics and high-temperature stability of a lithium battery may be improved. Additionally, since the silicon-based compound suppresses side reactions of an organic electrolytic solution, a SEI layer and/or a protection layer, each having low resistance, may be formed. Accordingly, internal resistance of a lithium battery may decrease.

In some embodiments wherein the disultone-based compound is represented by Formula 1, at least one of $A_1$, $A_2$, $A_3$, and $A_4$ is an unsubstituted C1 to C5 alkyl group or a substituted C1 to C5 alkyl group, and a substituent of the substituted C1 to C5 alkyl group may be a halogen-substituted or unsubstituted C1 to C5 alkyl group; a halogen-substituted or unsubstituted C5 to C10 aryl group; a halogen-substituted or unsubstituted C2 to C10 heteroaryl group; a halogen-substituted or unsubstituted C2 to C5 alkenyl group; a halogen-substituted or unsubstituted C2 to C5 alkynyl group; or a polar group having a heteroatom.

In some embodiments wherein the disultone-based compound is represented by Formula 1, a substituent of the substituted C1 to 5 alkyl group may be selected from a halogen, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrolyl group, and a pyridinyl group, but it not limited thereto.

In some embodiments wherein the disultone-based compound is represented by Formula 1, the substituent of the substituted C1 to C5 alkyl group may be a polar group having a heteroatom. The heteroatom of the polar group may include at least one selected from oxygen, nitrogen, phosphorous, sulfur, silicon, and boron.

In some embodiments, the polar group having a heteroatom may include at least one selected from —F, —Cl, —Br, —I, —C(=O)OR$^{16}$, —OR$^{16}$, —OC(=O)OR$^{16}$, —R$^{15}$OC(=O)OR$^{16}$, —C(=O)R$^{16}$, —R$^{15}$C(=O)R$^{16}$, —OC(=O)R$^{16}$, —R$^{15}$OC(=O)R$^{16}$, —C(=O)—O—C(=O)R$^{16}$, —R$^{15}$C(=O)—O—C(=O)R$^{16}$, —SR$^{16}$, —R$^5$SR$^{16}$, —SSR$^{16}$, —R$^5$SSR$^{16}$, —S(=O)R$^{16}$, —R$^5$S(=O)R$^{16}$, —R$^{15}$C(=S)R$^{16}$, —R$^{15}$SO$_3$R$^{16}$, —SO$_3$R$^{16}$, —NNC(=S)R$^{16}$, —R$^{15}$NNC(=S)R$^{16}$, R$^{15}$N=C=S, —NCO, —R$^{15}$—NCO, —NO$_2$, —R$^{15}$NO$_2$, —R$^5$SO$_2$R$^{16}$, —SO$_2$R$^{16}$,

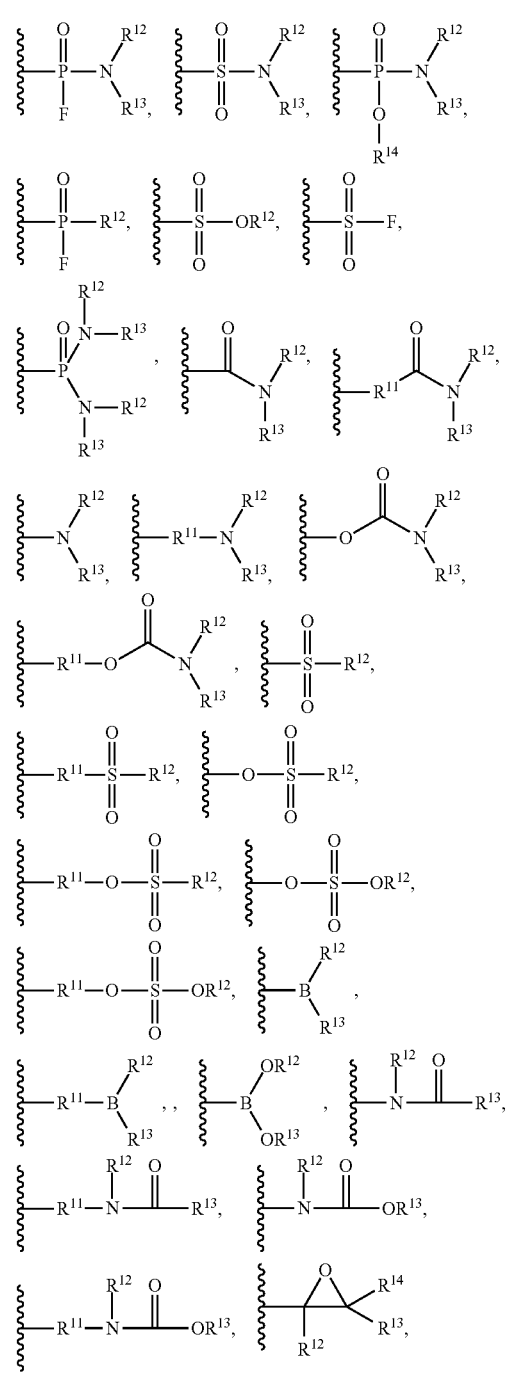

-continued

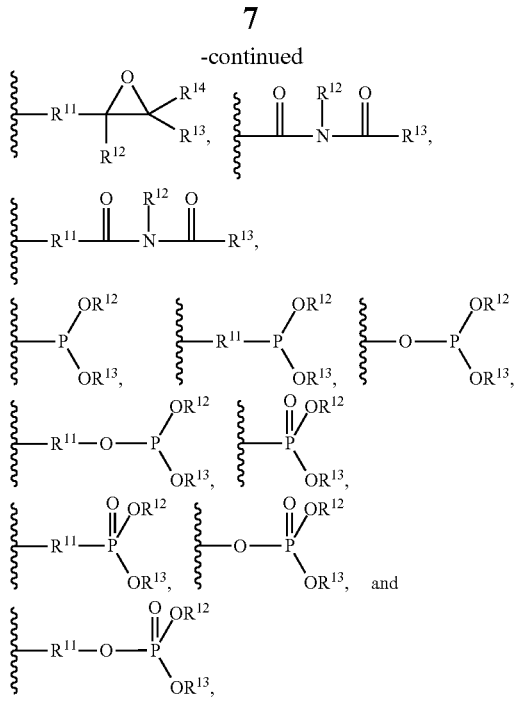

wherein $R^1$ and are each independently selected from a halogen-substituted or unsubstituted C1 to C10 alkyl group; a halogen-substituted or unsubstituted C2 to C10 alkenyl group; a halogen-substituted or unsubstituted C2 to C10 alkynyl group; a halogen-substituted or unsubstituted C3 to C10 cycloalkyl group; a halogen-substituted or unsubstituted C5 to C10 aryl group; a halogen-substituted or unsubstituted C2 to C10 heteroaryl group; a halogen-substituted or unsubstituted C6 to C15 alkyl aryl group; or a halogen-substituted or unsubstituted C6 to C15 aralkyl group, and $R^{12}$, $R^{13}$, $R^{14}$, and $R^{16}$ may be each independently a hydrogen; a halogen; a halogen-substituted or unsubstituted C1 to C10 alkyl group; a halogen-substituted or unsubstituted C2 to C10 alkenyl group; a halogen-substituted or unsubstituted C2 to C5 alkynyl group; a halogen-substituted or unsubstituted C3 to C10 cycloalkyl group; a halogen-substituted or unsubstituted C5 to C10 aryl group; a halogen-substituted or unsubstituted C2 to C10 heteroaryl group; a halogen-substituted or unsubstituted C6 to C15 alkyl aryl group; a halogen-substituted or unsubstituted C6 to C15 trialkylsilyl group; or a halogen-substituted or unsubstituted C6 to C15 aralkyl group.

In some embodiments, a halogen substituent of the substituted alkyl group, alkenyl group, alkynyl group, cycloalkyl group, aryl group, heteroaryl group, alkyl aryl group, trialkylsilyl group, and aralkyl group, polar group having a heteroatom, may be a fluorine (F).

In some embodiments the disultone-based compound may be represented by one of Formulae 3 and 4:

Formula 3

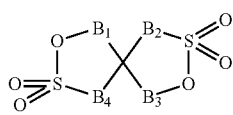

Formula 4

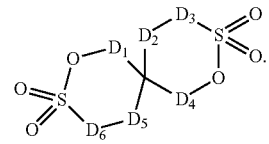

In some embodiments, in Formulae 3 and 4, $B_1$, $B_2$, $B_3$, $B_4$, $D_1$, $D_2$, $D_3$, $D_4$, $D_5$ and $D_6$ are each independently selected from —C($E_1$)($E_2$)—; a carbonyl group (—C(=O)—); or a sulfinyl group (—S(=O)—), and $E_1$ and $E_2$ are each independently selected from a hydrogen; a halogen; a halogen-substituted or unsubstituted C1 to C10 alkyl group; a halogen-substituted or unsubstituted C2 to C10 alkenyl group; a halogen-substituted or unsubstituted C2 to C10 alkynyl group; a halogen-substituted or unsubstituted C3 to C10 cycloalkenyl group; a halogen-substituted or unsubstituted C3 to C10 heterocyclic group; a halogen-substituted or unsubstituted C5 to C10 aryl group; or a halogen-substituted or unsubstituted C2 to C10 heteroaryl group.

In some embodiments, $E_1$ and $E_2$ are each independently selected from a hydrogen; a halogen; a halogen-substituted or unsubstituted C1 to C10 alkyl group; a halogen-substituted or unsubstituted C5 to C10 aryl group; or a halogen-substituted or unsubstituted C2 to C10 heteroaryl group.

In some embodiments, $E_1$ and $E_2$ are each independently selected from a hydrogen, F, CL, Br, I, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrolyl group, or a pyridinyl group.

In some embodiments, $E_1$ and $E_2$ are each independently selected from a hydrogen, a fluorine (F), a methyl group, an ethyl group, a trifluoromethyl group, a pentafluoroethyl group, or a phenyl group.

In some embodiments the disultone-based compound may be represented by one of Formulae 5 and 6:

Formula 5

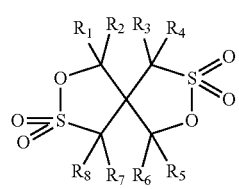

Formula 6

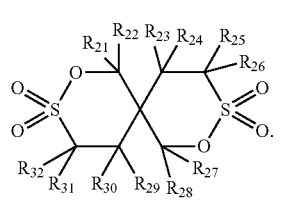

In some embodiments, in Formulae 5 and 6,
$R_1$, $R_2$, $R_3$, $R^4$, $R_5$, $R^6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently selected from a hydrogen; a halogen; a halogen-substituted or unsubstituted C1 to C10 alkyl group; a halogen-substituted or unsubstituted C5 to C10 aryl group; or a halogen-substituted or unsubstituted C2 to C10 heteroaryl group.

In some embodiments, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ each independently selected from a hydrogen, F, CL, Br, I, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrole group, or a pyridine group.

In some embodiments, $R_1$, $R_2$, $R_3$, $R_4$, $R_5$, $R_6$, $R_7$, $R_8$, $R_{21}$, $R^{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently selected from a hydrogen, F, a methyl group, an ethyl group, a propyl group, a trifluoromethyl group, a pentafluoroethyl group, or a phenyl group.

In some embodiments, the disultone-based compound may be represented by one of Formulae 3 to 18:

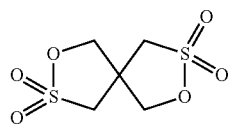

Formula 3

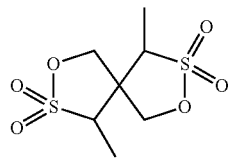

Formula 4

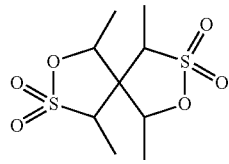

Formula 5

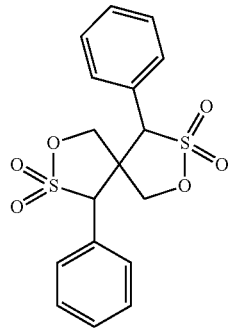

Formula 6

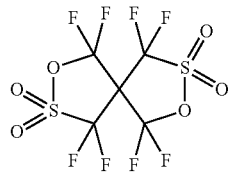

Formula 7

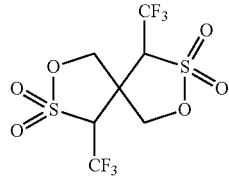

Formula 8

-continued

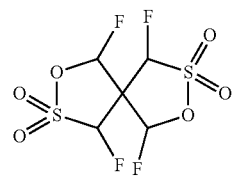

Formula 9

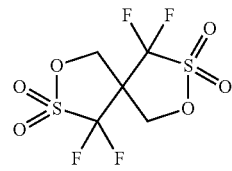

Formula 10

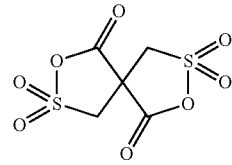

Formula 11

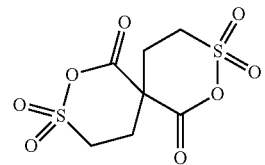

Formula 12

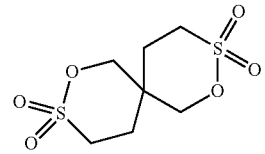

Formula 13

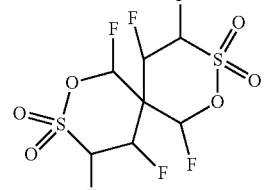

Formula 14

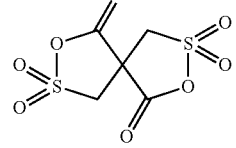

Formula 15

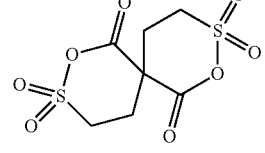

Formula 16

Formula 17

-continued

Formula 18

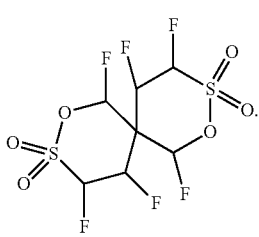

In some embodiments the silicon-based compound may be represented by one of Formulae 19 to 21:

Formula 19

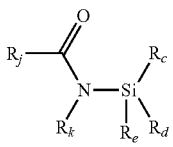

Formula 20

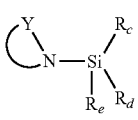

Formula 21

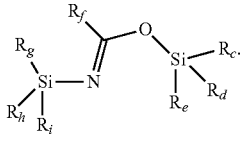

In some embodiments, in compounds of Formulae 19 to 21, Y is a covalent bond or a carbonyl group,

is a N atom-containing C2 to C10 aliphatic ring or aromatic ring, $R_j$ and $R_k$ are each independently selected from a hydrogen; a halogen-substituted or unsubstituted C1 to C10 alkyl group; or a halogen-substituted or unsubstituted C5 to C10 aryl group; $R_g$, $R_h$, and $R_i$ each independently selected from a halogen-substituted or unsubstituted C1 to C10 alkyl group; or a halogen-substituted or unsubstituted C5 to C10 aryl group; and $R_c$, $R_d$, $R_e$, and $R_f$ each independently selected from a hydrogen; a halogen-substituted or unsubstituted C1 to C10 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C10 alkenyl group; or a halogen-substituted or unsubstituted C2 to C10 alkynyl group.

In some embodiments,

may be an aliphatic ring or aromatic ring selected from a 2-oxazolidone, a pyrrolidine, a pyrrole, an imidazole, a pyrazole, an oxazole, isooxazole, a pyridine, a pyrazine, a pyrimidine, and a triazine.

In some embodiments, the silicon-based compound may be represented by one of Formulae 22 to 31:

Formula 22

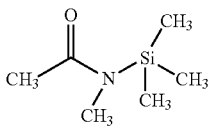

Formula 23

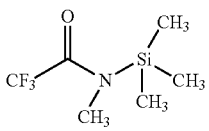

Formula 24

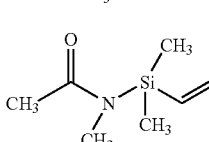

Formula 25

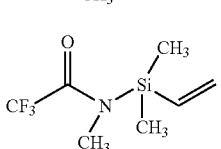

Formula 26

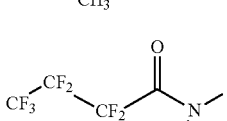

Formula 27

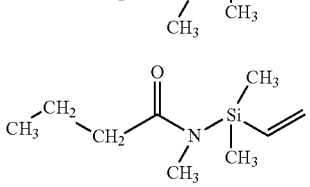

Formula 28

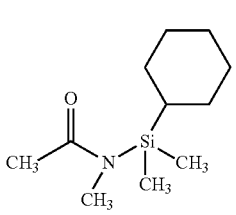

Formula 29

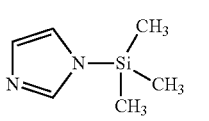

Formula 30

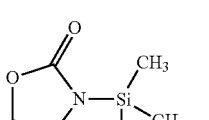

Formula 31

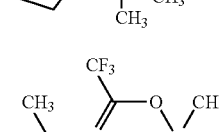

In the term "Ca to Cb" used herein, a and b, each indicate the number of carbon atoms constituting a group. For example, the group may include carbon atoms in the integers selected from a to b. For example, a "C1 to C4 alkyl group" may mean an alkyl group having 1 to 4 carbon atoms, wherein a is 1 and b is 4, and examples thereof are CH$_3$—, CH$_3$CH$_2$—, CH$_3$CH$_2$CH$_2$—, (CH$_3$)$_2$CH—, CH$_3$CH$_2$CH$_2$CH$_2$—, CH$_3$CH$_2$CH(CH$_3$)—, and (CH$_3$)$_3$C—.

The nomenclature of a particular radical may include a mono-radical or a di-radical. For example, when a substituent requires two linking points to a molecule, the substituent is to be recognized as a diradical. For example, a substituent such as an alkyl group requiring two linking points may include a di-radical, such as —CH$_2$—, —CH$_2$CH$_2$—, or —CH$_2$CH(CH$_3$)CH$_2$—.

The term "alkyl group" used herein refers to a branched or non-branched aliphatic hydrocarbon group. In some embodiments, an alkyl group may be substituted or unsubstituted. Examples of the alkyl group are a methyl group, an ethyl group, a propyl group, an isopropyl group, a butyl group, an isobutyl group, a tert-butyl group, pentyl group, or a hexyl group, but are not limited thereto. These alkyl groups may be optionally substituted or unsubstituted. In some embodiments, the alkyl group may have 1 to 5 carbon atoms. For example, a C1 to C5 alkyl group may be methyl, ethyl, propyl, isopropyl, butyl, iso-butyl, sec-butyl, pentyl, 3-pentyl, or hexyl, but is not limited thereto.

The term "cycloalkyl group" used herein refers to a completely saturated carbocyclic ring or ring system. For example, examples of the cycloalkyl group are cyclopropyl, cyclobutyl, cyclopentyl, and cyclohexyl.

The term "alkenyl group" used herein refers to a hydrocarbon group that includes at least one C=C double bond and 2 to 10 carbon atoms. Examples of the alkenyl group are an ethenyl group, a 1-propenyl group, a 2-propenyl group, a 2-methyl-1-propenyl group, a 1-butenyl group, a 2-butenyl group, but are not limited thereto. In some embodiments, the alkenyl group may be substituted or unsubstituted. In some embodiments, the alkenyl group may have 2 to 10 carbon atoms.

The "alkynyl group" used herein refers to a hydrocarbon group that has at least one C—C triple bond and 2 to 10 carbon atoms. Examples of the alkynyl group are an ethynyl group, a 1-propynyl group, a 1-butynyl group, and a 2-butynyl group, but are not limited thereto. In some embodiments, the alkynyl group may be substituted or unsubstituted. In some embodiments, the alkynyl group may have 2 to 10 carbon atoms.

The term "aromatic" used herein refers to a ring or ring system that has a conjugated pi-electron system, and may include an all carbon ring to form the aromatic group (for example, a phenyl group) and a ring containing heteroatoms to form the heteroaromatic group (for example, a pyridine). This term includes a monocyclic-ring or fused polycyclic-ring (that is, a ring that shares adjacent a pair of atoms), if the entire ring system is aromatic.

The term "aryl group" used herein refers to an aromatic ring or ring system (that is, two or more fused rings that share adjacent carbon atoms) in which a ring skeleton includes only carbon. When the aryl group is a ring system, each ring in the system is aromatic. Examples of the aryl group are a phenyl group, a biphenyl group, a naphthyl group, a phenanthrenyl group, and a naphthalenyl group, but are not limited thereto. The aryl group may be substituted or unsubstituted.

The term "heteroaryl group" used herein refers to an aromatic ring system that has one ring or a plurality of fused rings, in which at least one ring atom is a heteroatom. In a fused ring system, at least one heteroatom may be present in only one ring. For example, the heteroatom may include oxygen, sulfur, and nitrogen, but it may be understood that embodiments are not limited thereto. Examples of the heteroaryl group are a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group, but are not limited thereo.

The terms "aralkyl group" and "alkylaryl group" used herein refer to an aryl group that is linked as a substituent through an alkyl group, such as a C6 to C15 aralkyl group. Examples thereof are a benzyl group, a 2-phenethyl group, a 3-phenylpropyl group, and a naphthyl alkyl group, but are not limited thereto. In some embodiment, an alkyl group is a small chain alkyl group (that is, a C1 to C5 alkyl group).

The term "cycloalkenyl group" used herein refers to a carbocyclic ring or ring system having at least one double bond, that is, an aromatic ring-free ring system. For example, the cycloalkenyl group is a cyclopropenyl group, a cyclopentenyl group, a cyclohexenyl group, and a cycloheptenyl group.

The term "heterocyclic group" used herein refers to a non-aromatic ring or ring system which includes at least one heteroatom in a ring skeleton.

The term "halogen" used herein refers to a stable atom that is classified as a Group 17 element in the periodic table of elements. Examples of the halogen are fluorine, chlorine, bromine, and iodine, and in particular, fluorine and/or chlorine.

In the present specification, a substituent is introduced by replacing at least one hydrogen atom by other atom or group in an unsubstituted mother group. Unless otherwise defined, when a group is considered as being "substituted," the substituted group indicates a group that is substituted with at least one substituent selected from a C1 to C10 alkyl group, a C2 to C10 alkenyl group, a C3 to C10 cycloalkyl group, a C3 to C10 cycloalkenyl group, a C1 to C10 alkyl group, and a C5 to C10 aryl group. The wording that a group is "optionally substituted" means that the group can be substituted with the substituents described above.

In some embodiments, an amount of the disultone-based compound represented by Formula 1 in the organic electrolytic solution may be in a range of about 0.01 to about 10 wt % based on a total weight of the organic electrolytic solution, but is not limited thereto, and an appropriate amount thereof may be used according to purpose. In some embodiments, an amount of the disultone-based compound in the organic electrolytic solution may be in a range of about 0.1 to about 10 wt % based on a total weight of the organic electrolytic solution. In some embodiments, an amount of the disultone-based compound in the organic electrolytic solution may be in a range of about 0.1 to about 7 wt % based on a total weight of the organic electrolytic solution. In some embodiments, an amount of the disultone-based compound in the organic electrolytic solution may be in a range of about 0.1 to about 5 wt % based on a total weight of the organic electrolytic solution. In some embodiments, an amount of the disultone-based compound in the organic electrolytic solution may be in a range of about 0.2 to about 5 wt % based on a total weight of the organic electrolytic solution. In some embodiments, an amount of the disultone-based compound in the organic electrolytic solution may be in a range of about 0.5 to about 5 wt % based on a total weight of the organic electrolytic solution. In some embodiments, an amount of the disultone-based compound in the organic electrolytic solution may be in a range of about 1 to about 5 wt % based on a total weight of the organic electrolytic solution. Within these amount ranges, a formed battery may have improved characteristics.

In some embodiments, an amount of the silicon-based compound represented by Formula 2 in the organic electrolytic solution may be in a range of about 0.01 to about 5 wt % based on a total weight of the organic electrolytic solution, but is not limited thereto, and an appropriate amount thereof may be used according to purpose. In some embodiments, an amount of the silicon-based compound in the organic electrolytic solution may be in a range of about 0.1 to about 4 wt % based on a total weight of the organic electrolytic solution. In some embodiments, an amount of the silicon-based compound in the organic electrolytic solution may be in a range of about 0.1 to about 3.5 wt % based on a total weight of the organic electrolytic solution. In some embodiments, an amount of the silicon-based compound in the organic electrolytic solution may be in a range of about 0.1 to about 3 wt % based on a total weight of the organic electrolytic solution. In some embodiments, an amount of the silicon-based compound in the organic electrolytic solution may be in a range of about 0.2 to about 3 wt % based on a total weight of the organic electrolytic solution. In some embodiments, an amount of the silicon-based compound in the organic electrolytic solution may be in a range of about 0.3 to about 3 wt % based on a total weight of the organic electrolytic solution. In some embodiments, an amount of the silicon-based compound in the organic electrolytic solution may be in a range of about 0.3 to about 2 wt % based on a total weight of the organic electrolytic solution. Within these amount ranges, a formed battery may have improved characteristics.

The organic solvent included in the organic electrolytic solution may be a solvent that has a low-boiling point. The solvent having a low-boiling point indicates a solvent that has a boiling point of 200° C. or lower at 1 atm.

In some embodiments, the organic solvent may include at least one selected from dialkylcarbonate, cyclic carbonate, linear or cyclic ester, linear or cyclic amide, aliphatic nitrile, linear or cyclic ether, and derivatives thereof.

In some embodiments, the organic solvent may include at least one selected from dimethyl carbonate (DMC), ethyl methyl carbonate (EMC), methyl propyl carbonate, ethyl propyl carbonate, diethyl carbonate(DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile (SN), dimethylsulfoxide, dimethylformamide, dimethylacetamide, gamma-valerolactone, gamma-butyrolactone, and tetrahydrofuran, but are not limited thereto. The organic solvent may be any solvent that has a low boiling point and is used in the art.

A concentration of the lithium salt in the organic electrolytic solution may be in a range of about 0.01 to about 2.0 M, but is not limited thereto. An appropriate concentration thereof may be used according to purpose. Within these concentration ranges, a formed battery may have improved characteristics.

The lithium salt used in the organic electrolytic solution is not particularly limited, and any lithium salt that is used in the art is available herein. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where each of x and y is an integer selected from 1 to 20), LiCl, LiI, or a mixture thereof may be used as the lithium salt.

The organic electrolytic solution may be liquid or gel. The organic electrolytic solution may be prepared by adding a lithium salt, the disultone-based compound of Formula 1, and the silicon-based compound of Formula 2 to the organic solvent.

A lithium battery according to an exemplary embodiment includes a cathode, an anode, and an organic electrolytic solution according to the embodiments described above. The lithium battery is not limited, and examples thereof include, in addition to a lithium secondary battery, a lithium primary battery. Examples of the lithium secondary battery are a lithium ion battery, a lithium ion polymer battery, and a lithium sulfur battery.

For example, the anode of the lithium battery may include graphite. The lithium battery may have a high voltage of 4.3 V or more.

For example, the lithium battery may be manufactured by using the following method.

First, a cathode is prepared.

For example, a cathode active material composition including a cathode active material, a conductive agent, a binder, and a solvent is prepared. The cathode active material composition may be directly coated on a metal current collector to prepare a cathode plate. In another embodiment, the cathode active material composition is cast on a separate support, and then, a film exfoliated from the support is laminated on a metal current collector to prepare a cathode plate. The method of forming the cathode is not limited thereto and any other method may also be used to form the cathode.

The cathode active material may be any one of lithium-containing metal oxides that are used in the art. For example, at least one of composite oxides, each including lithium and metal selected from cobalt, manganese, nickel, and a combination thereof, may be used, and detailed examples thereof are compounds represented by $Li_aA_{1-b}B^1{}_bD^1{}_2$ (wherein, $0.90 \leq a \leq 1.8$, and $0 \leq b \leq 0.5$); $Li_aE_{1-b}B^1{}_bO_{2-c}D^1{}_c$ (wherein, $0.90 \leq a \leq 1.8$, $0 \leq b \leq 0.5$, $0 \leq c \leq 0.05$); $LiE_{2-b}B^1{}_bO_{4-c}D^1{}_c$ (wherein, $0 \leq b \leq 0.5$, and $0 \leq c \leq 0.05$); $Li_aNi_{1-b-c}Co_bB^1{}_cD^1{}_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_2$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cD^1{}_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Mn_bB^1{}_cO_{2-\alpha}F^1{}_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (wherein, $0.90 \leq a \leq 1.8$, $0 \leq b \leq 0.5$, $0 \leq c \leq 0.05$, and $0 < \alpha < 2$); $Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein, $0.90 \leq a \leq 1.8$, $0 \leq b \leq 0.9$, $0 \leq c \leq 0.5$, and $0 \leq d \leq 0.5$, $0.001 \leq e \leq 0.1$); $Li_aNiG_bO_2$ (wherein, $0.90 \leq a \leq 1.8$, $0.001 \leq b \leq 0.1$); $Li_aCoG_bO_2$ (wherein, $0.90 \leq a \leq 1.8$, $0.001 \leq b \leq 0.1$); $Li_aMnG_bO_2$ (wherein, $0.90 \leq a \leq 1.8$, and $0.001 \leq b \leq 0.1$); $Li_aMn_2G_bO_4$ (wherein, $0.90 \leq a \leq 1.8$, and $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is Ni, Co, Mn, or a combination thereof; $B^1$ is Al, Ni, Co, Mn, Cr, Fe, Mg, Sr, V, a rare-earth element, or a combination thereof; $D^1$ is O (oxygen), F (fluorine), S (sulfur), P (phosphorous), or a combination thereof; E is Co, Mn, or a combination thereof; $F^1$ is F (fluorine), S (sulfur), P (phosphorous), or a combination thereof; G is Al, Cr, Mn, Fe, Mg, La, Ce, Sr, V, or a combination thereof; Q is Ti, Mo, Mn, or a combination thereof; $I^1$ is Cr, V, Fe, Sc, Y, or a combination thereof; and J is V, Cr, Mn, Co, Ni, Cu, or a combination thereof.

For example, $LiCoO_2$, $LiMn_xO_{2x}$ (x=1, 2), $LiNi_{1-x}Mn_xO_{2x}$ (0≤x≤1), $LiNi_{1-x-y}Co_xMn_yO_2$ (0≤x≤0.5, 0≤y≤0.5), $LiFePO_4$, or the like may be used.

These compounds may have a coating layer on their surfaces, or these compounds may be mixed with a compound having a coating layer. The coating layer may include an oxide of a coating element, a hydroxide of a coating element, an oxyhydroxide of a coating element, an oxycarbonate of a coating element, or a hydroxycarbonate of a coating element. These compounds that form the coating layer may be amorphous or crystalline. As a coating element included in the coating layer, Mg, Al, Co, K, Na, Ca, Si, Ti, V, Sn, Ge, Ga, B, As, Zr, or a mixture thereof may be used. The coating layer may be formed by using any one of various coating methods that are performed using the compounds and the elements and do not affect properties of the cathode active material (for example, spray coating, immersion, or the like). These coating methods may be well understood by one of ordinary skill in the art and thus, are not described in detail herein.

As the conductive agent, carbon black, graphite particulate, or the like may be used. However, the conductive agent is not limited thereto, and may be any one that is used as a conductive agent in the art.

Examples of the binder are a vinylidene fluoride/hexafluoropropylene copolymer, polyvinylidene fluoride (PVDF), polyacrylonitrile, polymethylmethacrylate, polytetrafluoroethylene, a mixture thereof, and a styrene butadiene rubber-based polymer, but are not limited thereto, and any one of materials that are used as a binder in the art may be used herein.

As the solvent, N-methylpyrrolidone, acetone, or water may be used.

However, the solvent is not limited thereto, and any one of various materials that are used in the art may be used herein.

Amounts of the cathode active material, the conductive agent, the binder, and the solvent may be the same as used in a lithium battery of the related art. According to the purpose and structure of a lithium battery, at least one selected from the conductive agent, the binder, and the solvent may not be used.

An anode is prepared.

For example, an anode active material composition including an anode active material, a conductive agent, a binder, and a solvent is prepared. The anode active material composition is directly coated and dried on the metal current collector to prepare an anode plate. In some embodiments, the anode active material composition is cast on a separator support and a film exfoliated from the support is laminated on a metal current collector to prepare an anode electrode plate.

The anode active material may be any one of various materials that are used as an anode active material for a lithium battery in the art. For example, the anode active material may include at least one selected from lithium metal, lithium-alloyable metal, transition metal oxide, non-transition metal oxide, and a carbonaceous material.

In some embodiments, the lithium-alloyable metal may be Si, Sn, Al, Ge, Pb, Bi, Sb, Si—Y alloy (where Y is alkali metal, alkali earth metal, a Group 13 element, a Group 14 element, transition metal, rare earth element, or a combination thereof element and is not Si), or Sn—Y alloy (where Y is alkali metal, alkali earth metal, a Group 13 element, a Group 14 element, transition metal, rare earth element, or a combination thereof element and is not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

In some embodiments, the transition metal oxide may be a lithium titanium oxide, a vanadium oxide, or a lithium vanadium oxide.

In some embodiments, the transition metal oxide may be $SnO_2$, $SiO_x$ (0<x<2), or the like.

The carbonaceous material may be a crystalline carbon, an amorphous carbon, or a mixture thereof. The crystalline carbon may be natural or artificial graphite that is non-shaped, tabular, flake, spherical, or fibrous, and the amorphous carbon may be soft carbon (cold calcined carbon) or hard carbon, meso-phase pitch carbide, calcined corks, or the like.

The conductive agent and the binder included in the anode active material composition may be the same as those used in the cathode active material composition.

Amounts of the anode active material, the conductive agent, the binder, and the solvent may be the same as used in a lithium battery of the related art. According to the purpose and structure of a lithium battery, at least one selected from the conductive agent, the binder, and the solvent may not be used.

Then, a separator which is to be inserted between the cathode and the anode is prepared.

The separator may be any one of various materials that are typically used in a lithium battery. A material for forming the separator may be a material that has low resistance to ion migration of an electrolyte and has excellent electrolytic solution retaining capability. For example, the separator forming material may be selected from glass fiber, polyester, Teflon, polyethylene, polypropylene, polytetrafluoroethylene (PTFE), and a combination thereof, each of which may be in a non-woven fabric or woven fabric form. For example, a separator for a lithium ion battery may be a rollable separator formed of polyethylene or polypropylene, and a separator for a lithium ion polymer battery may be a separator having excellent organic electrolyte-retaining capabilities. For example, these separators may be prepared by using the following method.

A separator composition is prepared by mixing a polymer resin, a filler, and a solvent. The separator composition may be directly coated or dried on an electrode to complete the formation of the separator. In some embodiments, the separator composition may be cast on a separate support and then the film separated from the support is laminated on an electrode, thereby completing the formation of the separator.

A polymer resin used in preparing the separator may not be particularly limited, and any material that is used as a binder for an electrode plate may be used. For example, a vinylidene fluoride/hexafluoropropylene copolymer, polyvinylidenefluoride (PVDF), polyacrylonitrile, polymethylmethacrylate, or a mixture thereof may be used.

Then, the organic electrolytic solution described above is prepared.

Figure 4:
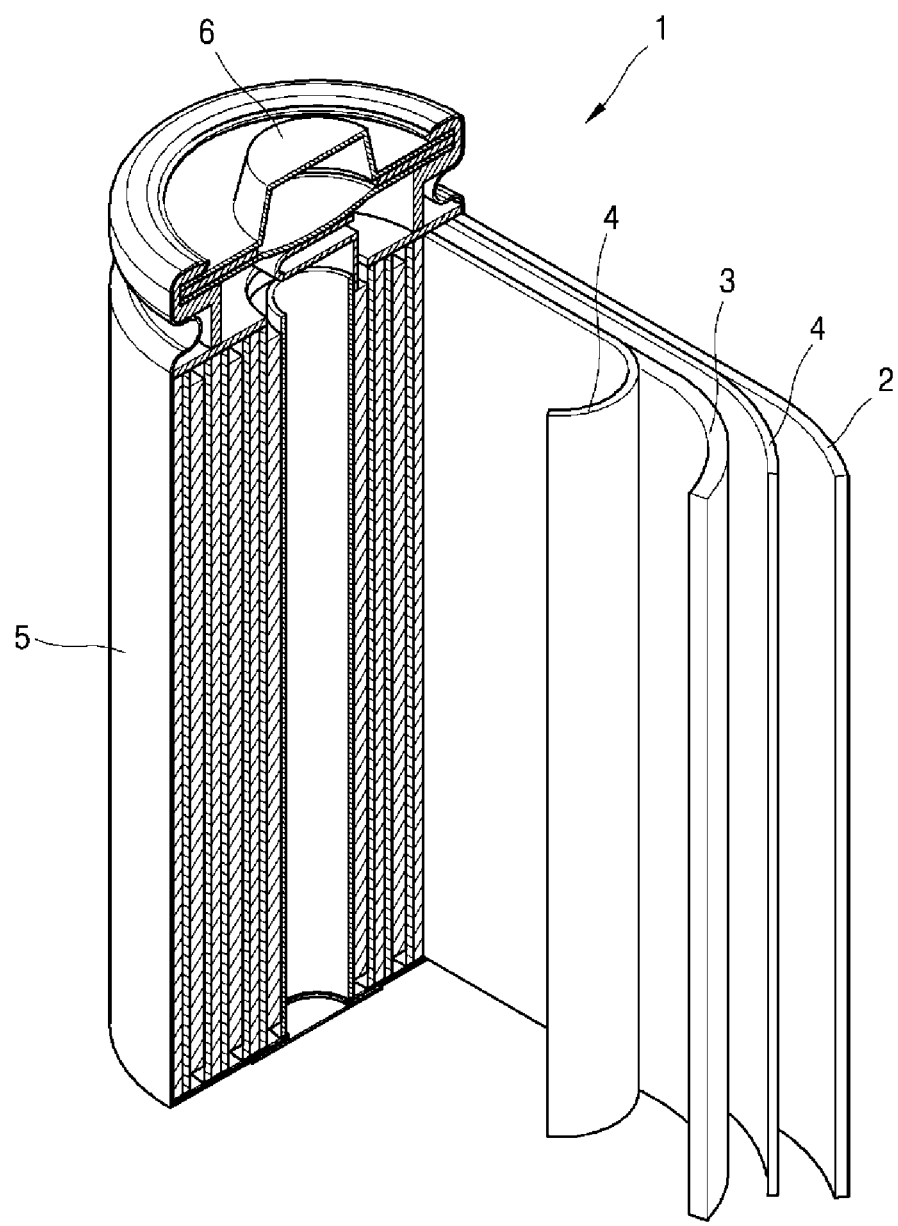
FIG. 4 is a schematic view of a lithium battery according to an exemplary embodiment.

Referring to FIG. 4, a lithium battery 1 includes a cathode 3, an anode 2, and a separator 4. The cathode 3, the anode 2, and the separator 4 are wound or folded to be placed in a battery case 5. Subsequently, an organic electrolytic solution is injected into the battery case 5, and the result structure is sealed with a cap assembly 6, thereby completing the manufacturing of the lithium battery 1. The battery case 5 may be a circular case, a rectangular case, or a thin-film type case. For example, the lithium battery may be a large thin film-type battery. The lithium battery may be a lithium ion battery.

A separator may be placed between the cathode and the anode to complete the manufacture of a battery assembly. In some embodiments, battery assemblies, each having the structure described above, are stacked in a bi-cell structure, and the result structure is immersed in an organic electrolytic solution, and the obtained result is housed in a pouch, followed by being sealed, thereby completing the manufacturing of a lithium ion polymer battery.

Also, a plurality of the battery assemblies may be stacked to form a battery pack, and the battery pack may be used in various devices that require high capacity and high power output. For example, the battery pack may be used in a notebook computer, a smart phone, an electric vehicle, or the like.

In particular, due to its high energy density and lifespan characteristics, the lithium battery may be suitable for use in an electric vehicle (EV). For example, the lithium battery is suitable for use in a hybrid car, such as a plug-in hybrid electric vehicle (PHEV). Also, the lithium battery may be used in applications requiring a great amount of electric power. For example, the battery pack may be used in an electric vehicle, electrically driven tools, and so on.

The embodiments of the present disclosure are described in detail with reference to Examples and Comparative Examples below. However, Examples are provided here for illustrative purpose only, and do not limit the scope of the present disclosure.

Synthesis of Additives

Preparation Example 1

Synthesis of Compound Represented by Formula 7

A compound represented by Formula 7 may be prepared according to Reaction Scheme 1.

Reaction Scheme 1:

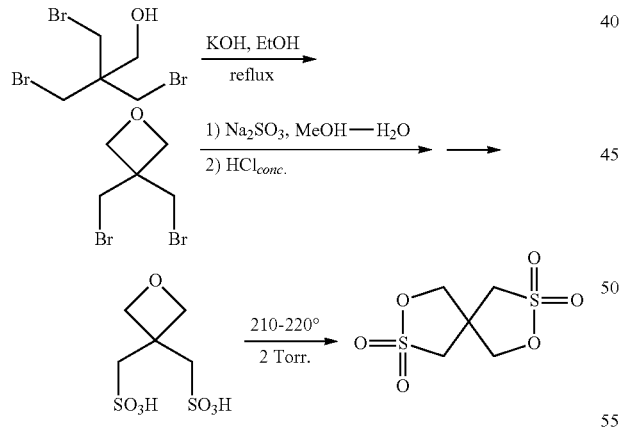

10.34 g (0.156 mole) of potassium hydroxide dissolved in 200 ml of ethanol was added dropwise to 50 g (0.154 mole) of pentaerythritol tribromide dissolved in 200 ml of ethanol, and the mixture was refluxed for 30 minutes. Then, the mixture was cooled to room temperature, and KBr was filtered therefrom, ethanol was evaporated therefrom, and the residual was distilled under a vacuum condition to obtain 28 g (0.115 mole) of 3,3-bis(bromomethyl)oxacyclobutane (75%, b.p. 72-78° C. @10 mmHg).

$^1$H NMR (400 MHz, CDCl3): δ 3.84 (s, 4H), 4.42 (s, 4H), 4.58 (s, 4H).

28 g (0.115 mole) of 3,3-bis(bromomethyl)oxacyclobutane dissolved in a mixed solvent including 94 ml of methanol and 28 ml of water was added dropwise to 44.8 g (0.358 mol) of $Na_2SO_3$ dissolved in 252 ml of water. The mixture was refluxed for 3.5 hours, and then, a solvent was removed therefrom under a vacuum condition. The residual was treated at room temperature with 200 ml of conc. HCl and then, NaCl was filtered therefrom. A sulfonic acid solution was filtered under vacuum, and then, the residual oil was heated at a pressure of 2 mm Hg at a temperature of 210 to 220° C. for 2 hours. The obtained black mass was extracted by using a boiling dioxane, and then, the resultant solution was subjected to filtration while the solution was hot. After the solution obtained by the filtering was cooled, disultone was crystallized.

Yield: 10 g (38%, m.p. 244-246° C.). $^1$H NMR (400 MHz, DMSO-d6): δ 3.87 (s, 2H), 3.88 (s, 2H), 4.58 (s, 4H).

Formula 7

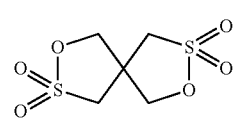

Preparation of Organic Electrolytic Solution

Example 1

1.15M $LiPF_6$, which is a lithium salt, 1.0 wt % of the disultone-based compound represented by Formula 7, and 0.5 wt % of the silicon-based compound represented by Formula 23 were added to a mixed solvent including ethylene carbonate (EC), ethyl methyl carbonate (EMC), and dimethyl carbonate (DMC) in a volumetric ratio of 2:4:4 to prepare an organic electrolytic solution.

Formula 23

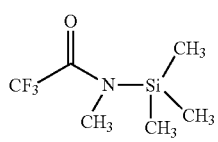

Example 2

1.15M $LiPF_6$, which is a lithium salt, 1.0 wt % of the disultone-based compound represented by Formula 7, and 0.5 wt % of the silicon-based compound represented by Formula 25 were added to a mixed solvent including ethylene carbonate (EC), ethyl methyl carbonate (EMC), and dimethyl carbonate (DMC) in a volumetric ratio of 2:4:4 to prepare an organic electrolytic solution.

Formula 25

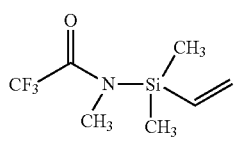

Comparative Example 1

An organic electrolytic solution was prepared in the same manner as in Example 1, except that the disultone-based compound of Formula 7 was not added.

Comparative Example 2

An organic electrolytic solution was prepared in the same manner as in Example 2, except that the disultone-based compound of Formula 7 was not added.

Comparative Example 3

An organic electrolytic solution was prepared by adding 1.15M $LiPF_6$, which is a lithium salt, to a mixed solvent including ethylenecarbonate (EC), ethylmethylcarbonate (EMC), and dimethylcarbonate (DMC) at a volumetric ratio of 2:4:4. Therefore, the disultone-based compound and the silicon-based compound were not used.

Manufacture of Lithium Battery

Example 3

Preparation of Cathode 93.0 wt % of $LiNi_{0.6}Co_{0.2}Mn_{0.2}O_2$, which is a cathode active material, 4.0 wt % of Denka black, which is a conductive material, and 3.0 wt % of PVDF (SOLEF® 6020, a product of Solvay Inc. Bollate, Italy), which is a binder, were mixed, and to the mixture was added N-methyl-2-pyrrolidone as the solvent, and dispersed by using a mechanical agitator for 30 minutes to prepare a cathode active material composition. The cathode active material composition was coated on an aluminum foil current collector having a thickness of 20 μm by using a doctor blade to form a coating layer having a thickness of about 60 μm. The coating layer was dried in a hot-air dryer at a temperature of 100° C. for 0.5 hours, and then dried under vacuum at a temperature of 120° C. for 4 hours. The resulting material was roll-pressed to completely manufacture a cathode including a cathode active material layer formed on a current collector. A density of the cathode active material layer was 3.15 g/cc, and a loading level thereof was 27.05 mg/cm².

Preparation of Anode 97 wt % of graphite particles (MC20, a product of Mitsubishi Chemical Corporation, Tokyo Japan), which is an anode active material, 1.5 wt % of BM408 (a product of Daicel Inc., Osaka, Japan), which is a conductive material, and 1.5 wt % of BM400-B (a product of Zeon Inc., Tokyo Japan), which is a binder, were mixed, and to the mixture was added N-methyl-2-pyrrolidone as the solvent, and dispersed by using a mechanical agitator for 60 minutes to prepare an anode active material composition. The anode active material composition was coated on a copper current collector having a thickness of 10 μm by using a doctor blade to form a coating layer having a thickness of about 60 Jim. The coating layer was dried in a hot-air dryer at a temperature of 100° C. for 0.5 hours, and then dried under vacuum at a temperature of 120° C. for 4 hours. The resulting material was roll-pressed to completely manufacture an anode including an anode active material layer formed on a current collector. A density of the anode active material layer was 1.55 g/cc, and a loading level thereof was 14.36 mg/cm².

Assembly of Lithium Battery

A lithium battery was manufactured by using the cathode, the anode, and a polyethylene separator having a thickness of 18 μm with a ceramic coated thereon, and the electrolytic solution prepared according to Example 1.

Example 4

A lithium battery was manufactured in the same manner as in Example 3, except that the organic electrolytic solution prepared according to Example 2 was used instead of the organic electrolytic solution prepared according to Example 1.

Comparative Examples 4 to 6

A lithium battery was manufactured in the same manner as in Example 3, except that the organic electrolytic solution prepared according to Comparative Examples 1-3 was used instead of the organic electrolytic solution prepared according to Example 1.

Evaluation Example 1

Charging and Discharging Characteristics Evaluation at Room Temperature (25° C.)

The lithium batteries manufactured according to Examples 3 and 4 and Comparative Examples 4 to 6 were charged with a constant current at a temperature of 25° C. at 0.1C rate of current until a voltage reached 4.3 V (vs. Li), and subsequently, in a constant voltage mode, while 4.3 V was maintained, a cut-off was performed thereon at 0.05C rate of current. Then, discharging was performed thereon at 0.1C rate of constant current until the voltage reached 2.8 V (vs. Li) (Formation process, $1^{st}$ cycle).

The lithium batteries that had experience $1^{st}$ cycle of the formation process were charged with constant current at a temperature of 25° C. at 0.2C rate of current until a voltage reached 4.3 V (vs. Li), and then, in a constant voltage mode, while the voltage of 4.3 V was maintained, the cut-off was performed at 0.05C rate of current. Then, discharging was performed thereon at 0.2C rate of constant current until a voltage reached 2.8 V(vs. Li) (Formation process, $2^{nd}$ cycle).

The lithium batteries that had experienced the formation process were charged with constant current at a temperature of 25° C. at 0.5C rate of current until a voltage reached 4.3 V (vs. Li), and then, in a constant voltage mode, while the voltage of 4.3 V was maintained, the cut-off was performed at 0.05C rate of current. Then, discharging was performed thereon at 1.0C rate of constant current until the voltage reached 2.8 V (vs. Li) (Formation process, $100^{th}$ cycle).

In all of the charging and discharging cycles, every charging/discharging cycle was followed by 10 minutes of storing.

Some of the charging/discharging test results are shown in Table 1 and FIG. 1. A capacity retention ratio in the $100^{th}$ cycle is defined as below.

$$\text{Capacity retention ratio} = [\text{discharge capacity in } 100^{th} \text{ cycle/discharge capacity in } 1^{st} \text{ cycle}] \times 100 \quad \text{Equation 1}$$

TABLE 1

| | Capacity retention ratio in the 100th cycle |
|---|---|
| Example 3 | 97.3 |
| Example 4 | 97.0 |
| Comparative Example 4 | 96.0 |
| Comparative Example 5 | 93.9 |
| Comparative Example 6 | 94.6 |

As shown in Table 1 and FIG. 1, it may be seen that the lithium batteries of Examples 3 and 4 including the organic electrolytic solution according to embodiments have better lifespan characteristics at room temperature than the lithium batteries of Comparative Examples 4 to 6.

Evaluation Example 2

Direct Current-Internal Resistance (DC-IR) Evaluation at Room Temperature (25° C.)

With respect to the lithium batteries of Examples 3 and 4 and Comparative Examples 4 to 6, at room temperature (25° C.), direct current-internal resistances (DC-IR) of the lithium batteries was measured before the lifespan characteristics evaluation of Evaluation Example 1 and after 100 cycles of charging and discharging (that is, after the lifespan characteristics evaluation).

In the $1^{st}$ cycle, the lithium batteries were charged at 0.5C of current until a voltage reached 50% of SOC (state of charge), and then, cut-off was performed at 0.02C, followed by 10 minutes of storing, and then, the lithium batteries were discharged with constant current at 0.5C for 30 seconds, sequentially followed by 30 seconds of storing, charging with constant current at 0.5C for 30 seconds, and 10 seconds of storing in that order, and then, the lithium batteries were discharged with constant current at 1.0C for 30 seconds, sequentially followed by 30 seconds of storing, charging with constant current at 0.5C for 1 minute, and 10 seconds of storing in that order, and then, the lithium batteries were discharged with constant current at 2.0C for 30 seconds, sequentially followed by 30 seconds of storing, charging with constant current at 0.5C for 2 minutes, and 10 seconds of storing in that order, and then, the lithium batteries were discharged with constant current at 3.0C for 30 seconds, sequentially followed by 30 seconds of storing, charging with constant current at 0.5C for 3 minutes, and 10 seconds of storing in that order.

An average of voltage drop values for 30 seconds at corresponding C-rates is a direct current resistance value, i.e., R=ΔV/ΔI.

The measured direct current resistance values are shown in Table 2.

In Table 2, an initial direct current resistance is a direct current resistance of a lithium battery before the lifespan characteristics evaluation thereof in Evaluation Example 1, and a post-100 cycles direct current resistance is a direct current resistance of a lithium battery after 100 cycles of charging and discharging.

In Table 3, the measured direct current resistance is represented as output power.

A direct current resistance increase ratio satisfies Equation 2, and an output power change ratio satisfies Equation 3.

Direct current resistance increase ratio [%]=[post-100 cycles direct current resistance/initial direct current resistance]×100    Equation 2

Output power change ratio [%]=[post-100cycles output power/initial output power]×100    Equation 3

TABLE 2

| | Initial direct current resistance [mΩ] | Post-100 cycles current resistance [mΩ] | Direct current resistance increase ratio [%] |
|---|---|---|---|
| Example 3 | 250.152 | 253.125 | 101.19 |
| Example 4 | 245.126 | 256.187 | 100.81 |
| Comparative Example 4 | 244.658 | 255.984 | 104.63 |
| Comparative Example 5 | 248.287 | 257.125 | 103.56 |
| Comparative Example 6 | 251.706 | 265.198 | 105.36 |

TABLE 3

| | Initial output power [W] | Post-100 cycles output power [W] | Output power change ratio [%] |
|---|---|---|---|
| Example 3 | 31.34 | 30.97 | 98.83 |
| Example 4 | 30.85 | 30.6 | 99.2 |
| Comparative Example 4 | 32.04 | 30.63 | 95.58 |
| Comparative Example 5 | 31.58 | 30.49 | 96.56 |
| Comparative Example 6 | 31.15 | 29.56 | 94.91 |

As shown in Table 2-3, it can be seen that the lithium batteries of Examples 3 and 4 including the organic electrolytic solution according to an embodiment of the present disclosure have a lower increase ratio of direct current resistance and a greater change ratio of output power than the lithium batteries of Comparative Examples 4 to 6 that do not include the organic electrolytic solution.

Evaluation Example 3

High-Temperature Stability Evaluation at Temperature of 60° C.

In a $1^{st}$ cycle, at room temperature (25° C.), the lithium batteries manufactured according to Examples 3 to 4 and Comparative Examples 4 to 6 were charged with a constant current at a rate of 0.5C until the voltage reached 4.3 V, and then, while the voltage was maintained at 4.3 V, the lithium batteries were charged at a constant voltage until the current reached 0.05C, and then discharged with a constant current at a rate of 0.5C until the voltage reached 2.8 V.

In a $2^{nd}$ cycle, the lithium batteries were charged with a constant current at a rate of 0.5C until the voltage reached 4.3 V, and then, while the voltage was maintained at 4.3 V, the lithium batteries were charged at a constant voltage until the current reached 0.05C, and then, discharged with a constant current at a rate of 0.2C until the voltage reached 2.8 V.

In a $3^{th}$ cycle, the lithium batteries were charged with a constant current at a rate of 0.5C until the voltage reached 4.3 V, and then, while the voltage was maintained at 4.3 V, the lithium batteries were charged at a constant voltage until the current reached 0.05C, and then discharged with a constant current at a rate of 0.2C until the voltage reached 2.80 V. A discharging capacity in the $3^{rd}$ cycle was regarded as a reference capacity.

In a $4^{th}$ cycle, the lithium batteries were charged at a rate of 0.5C until the voltage reached 4.30 V, and then, while the voltage was maintained at 4.30 V, a constant voltage was charged until the current reached 0.05C, and then, the lithium batteries were stored in an oven at a temperature of 60° C. for 10 days and 30 days and then, the lithium batteries were taken out of the oven and discharged at a rate of 0.1C until the voltage reached 2.80 V. Charging and discharging evaluation results are shown in Table 4 and FIG. 2. The capacity retention ratio after the high-temperature storing satisfies Equation 4:

High temperature storing-post capacity retention ratio [%]=[Discharging capacity after storing at high temperature in $4^{th}$ cycle/reference capacity]×100(the reference capacity is a discharging capacity in the 3rd cycle).   Equation 4

TABLE 4

|  | Capacity retention ratio after 10 days of storing [%] | Capacity retention ratio after 30 days of storing [%] |
|---|---|---|
| Example 3 | 94.51 | 91.91 |
| Example 4 | 93.13 | 91.02 |
| Comparative Example 4 | 93.48 | 89.39 |
| Comparative Example 5 | 92.12 | 89.40 |
| Comparative Example 6 | 91.83 | 86.94 |

Figure 2:
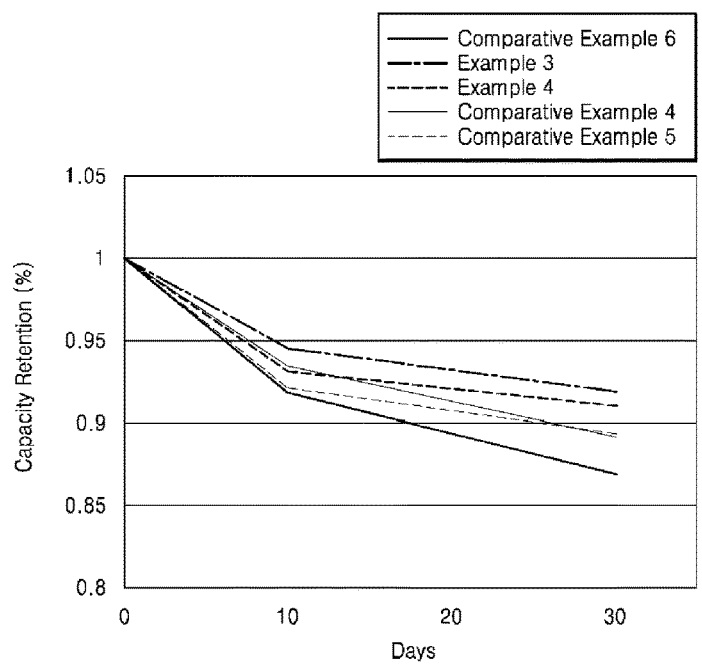
FIG. 2 is a graph showing the capacity retention ratio of lithium batteries manufactured according to Examples 3 and 4 and Comparative Examples 4 to 6 after high-temperature storage at a temperature of 60° C.

As shown in Table 4 and FIG. 2, it may be seen that the lithium batteries of Examples 3 and 4 including the organic electrolytic solution according to an embodiment of the present disclosure have higher high-temperature stability than the lithium batteries of Comparative Examples 4 to 6 that do not include the organic electrolytic solution.

Evaluation Example 4

Direct Current-Resistance (DC-IR) Evaluation after High-Temperature Storing at a Temperature of 60° C.

Direct current-resistance (DC-IR) of the lithium batteries manufactured according to Examples 3 and 4 and Comparative Examples 4 to 6 were evaluated at room temperature (25° C.). Herein, the lithium batteries used herein include a lithium battery that was not placed in an oven at a temperature of 60° C., and lithium batteries that were placed in an oven at a temperature of 60° C. and then taken out of the oven and stored for 10 days, 20 days, and 30 minutes, all of which were used in the high-temperature stability evaluation in Evaluation Example 3.

In the $1^{st}$ cycle, the lithium batteries were charged at 0.5C of current until a voltage reached 50% of SOC (state of charge), and then, cut-off was performed at 0.02C, followed by 10 minutes of storing, and then,
the lithium batteries were discharged with constant current at 0.5C for 30 seconds, sequentially followed by 30 seconds of storing, charging with constant current at 0.5C for 30 seconds, and 10 seconds of storing in this stated order, and then, the lithium batteries were discharged with constant current at 1.0C for 30 seconds, sequentially followed by 30 seconds of storing, charging with constant current at 0.5C for 1 minute, and 10 seconds of storing in this stated order, and then, the lithium batteries were discharged with constant current at 2.0C for 30 seconds, sequentially followed by 30 seconds of storing, charging with constant current at 0.5C for 2 minutes, and 10 seconds of storing in this stated order, and then, the lithium batteries were discharged with constant current at 3.0C for 30 seconds, sequentially followed by 30 seconds of storing, charging with constant current at 0.5C for 3 minutes, and 10 seconds of storing in this stated order.

An average of voltage drop values for 30 seconds at corresponding C-rates is a direct current resistance value.

Figure 3:
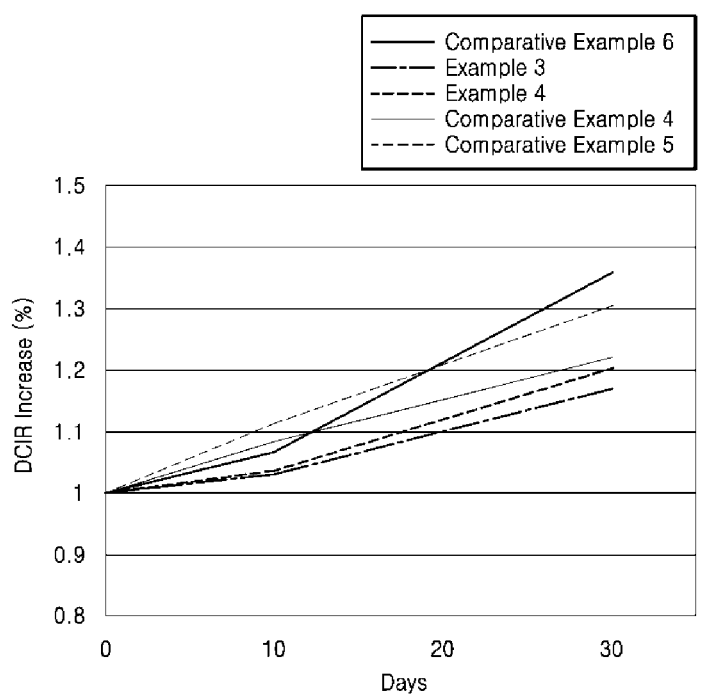
FIG. 3 is a graph showing the direct current-internal resistance (DC-IR) of lithium batteries manufactured according to Examples 3 and 4 and Comparative Examples 4 to 6 after high-temperature storage at a temperature of 60° C.

Some of the direct current resistance values are shown in Table 5 and FIG. 3.

Direct current resistance increase ratio [%]=[Direct current resistance after high-temperature storing/initial direct current resistance]×100   Equation 5

TABLE 5

|  | Direct current resistance increase ratio after 10 days of storing [%] | Direct current resistance increase ratio after 30 days of storing [%] |
|---|---|---|
| Example 3 | 103.19 | 116.91 |
| Example 4 | 103.65 | 120.34 |
| Comparative Example 4 | 108.39 | 122.20 |
| Comparative Example 5 | 111.35 | 130.47 |
| Comparative Example 6 | 106.75 | 135.85 |

As shown in Table 5 and FIG. 3, it may be seen that the lithium batteries of Examples 3 and 4 including the organic electrolytic solution according to an embodiment of the present disclosure have a lower increase ratio of direct current resistance than the lithium batteries of Comparative Examples 4 to 6 that do not include the organic electrolytic solution.

Evaluation Example 5

High-Temperature Gas Generation Rate Evaluation at Temperature of 80° C.

In a $1^{st}$ cycle, at room temperature (25° C.), the lithium batteries manufactured according to Examples 3 to 4 and Comparative Examples 4 to 6 were charged with a constant current at a rate of 0.5C until the voltage reached 4.3 V, and then, while the voltage was maintained at 4.3 V, the lithium batteries were charged at a constant voltage until the current reached 0.05C, and then discharged with a constant current at a rate of 0.5C until the voltage reached 2.8 V.

In a $2^{nd}$ cycle, the lithium batteries were charged with a constant current at a rate of 0.5C until the voltage reached 4.3 V, and then, while the voltage was maintained at 4.3 V, the lithium batteries were charged at a constant voltage until the current reached 0.05 C, and then, discharged with a constant current at a rate of 0.2C until the voltage reached 2.8 V.

In a 3rd cycle, the lithium batteries were charged with a constant current at a rate of 0.5C until the voltage reached 4.3 V, and then, while the voltage was maintained at 4.3 V, the lithium batteries were charged at a constant voltage until the current reached 0.05C, and then discharged with a constant current at a rate of 0.2C until the voltage reached 2.80 V. A discharging capacity in the 3rd cycle was regarded as a reference capacity.

In a 4th cycle, the lithium batteries were charged at a rate of 0.5C until the voltage reached 4.30 V, and then, while the voltage was maintained at 4.30 V, a constant voltage was applied until the current reached 0.05C, and then, the lithium batteries were stored in an oven at a temperature of 80° C. for 14 days and then, the lithium batteries were taken out of the oven and then destroyed in a jig. Then, a change in the pressure of internal gas was converted into a volume to measure an amount of generated gas. Evaluation results are shown in Table 6 below. The gas generation ratio is indicated as a value relative to an amount of generated gas in Comparative Example 6, which is regarded as 100.

TABLE 6

|  | Gas generation ratio |
| --- | --- |
| Example 3 | 78.26 |
| Example 4 | 69.58 |
| Comparative Example 4 | 95.26 |
| Comparative Example 5 | 84.51 |
| Comparative Example 6 | 100 |

As shown in Table 6, it may be seen that the lithium batteries of Examples 3 and 4 including the organic electrolytic solution according to an embodiment of the present disclosure unexpectedly produces much less gas than the lithium batteries of Comparative Examples 4 to 6 that do not include the organic electrolytic solution.

Due to the inclusion of an organic electrolytic solution including a disultone-based compound and a silicon-based compound, lifespan characteristics and high-temperature stability of a lithium battery may be unexpectedly improved.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

In the present disclosure, the terms "Example", "Evaluation Example", "Preparation Example", and "Comparative Example" are used arbitrarily to simply identify a particular example or experimentation and should not be interpreted as admission of prior art. While one or more exemplary embodiments have been described with reference to the figures, it will be understood by those of ordinary skill in the art that various changes in form and details may be made therein without departing from the spirit and scope as defined by the following claims.

What is claimed is:

1. An organic electrolytic solution comprising:

a lithium salt; an organic solvent; a disultone-based compound represented by Formula 1; and a silicon-based compound represented by Formula 2:

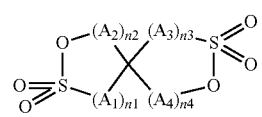

Formula 1

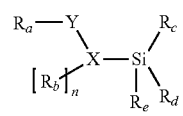

Formula 2 wherein in Formulae 1 and 2, $A_1$, $A_2$, $A_3$, and $A_4$ each are independently selected from a substituted or unsubstituted C1 to C5 alkyl group; a carbonyl group; or a sulfinyl group, n1 to n4 are each independently an integer from 1 to 3, when each of n1 to n4 is 2 or more, a plurality of $A_1$, $A_2$, $A_3$, or $A_4$ are identical or different, X is N or O, and n is 0 or 1, when X is O, n is 0, Y is a covalent bond, a carbonyl group, or —N═C($R_f$)—, $R_a$ and $R_b$ are each independently selected from a hydrogen; a halogen-substituted or unsubstituted C1 to C5 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C5 alkenyl group; a halogen-substituted or unsubstituted C2 to C5 alkynyl group; a halogen-substituted or unsubstituted C1 to C5 alkoxy group; a halogen-substituted or unsubstituted C1 to C5 alkylamine group; or —Si($R_g$)($R_h$)($R_i$), wherein $R_g$, $R_h$, and $R_i$ each are independently a halogen-substituted or unsubstituted C1 to C5 alkyl group, $R_c$, $R_d$, $R_e$, and $R_f$ are each independently selected from a hydrogen; a halogen-substituted or unsubstituted C1 to C5 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group;

a halogen-substituted or unsubstituted C2 to C5 alkenyl group; or a halogen-substituted or unsubstituted C2 to C5 alkynyl group, and $R_a$ and $R_b$ link to each other to form a ring.

2. The organic electrolytic solution of claim 1, wherein at least one of $A_1$, $A_2$, $A_3$, and $A_4$ is selected from an unsubstituted C1 to C5 alkyl group or a substituted C1 to C5 alkyl group, and a substituent of the substituted C1 to C5 alkyl group comprises a halogen-substituted or unsubstituted C1 to C5 alkyl group; a halogen-substituted or unsubstituted C5 to C10 aryl group; a halogen-substituted or unsubstituted C2 to C10 heteroaryl group; a halogen-substituted or unsubstituted C2 to C5 alkenyl group; a halogen-substituted or unsubstituted C2 to C5 alkynyl group; or a polar group having a heteroatom.

3. The organic electrolytic solution of claim 1, wherein at least one of $A_1$, $A_2$, $A_3$, and $A_4$ is an unsubstituted C1 to C5 alkyl group or a substituted C1 to C5 alkyl group, and a substituent of the substituted C1 to C5 alkyl group is selected from the group consisting of a halogen, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrolyl group, and a pyridinyl group.

4. The organic electrolytic solution of claim 1, wherein the disultone-based compound is represented by one of Formulae 3 and 4:

Formula 3

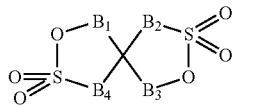

Formula 4

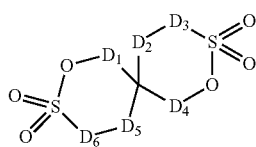

wherein in Formulae 3 and 4, $B_1$, $B_2$, $B_3$, $B_4$, $D_1$, $D_2$, $D_3$, $D_4$, $D_5$, and $D_6$ are each independently selected from —C($E_1$)($E_2$)-; a carbonyl group; or a sulfinyl group, and $E_1$ and $E_2$ are each independently selected from a hydrogen; a halogen; a halogen-substituted or unsubstituted C1 to C5 alkyl group; a halogen-substituted or unsubstituted C5 to C10 aryl group; or a halogen-substituted or unsubstituted C2 to C10 heteroaryl group.

5. The organic electrolytic solution of claim 1, wherein the disultone-based compound is represented by one of Formulae 5 and 6:

Formula 5

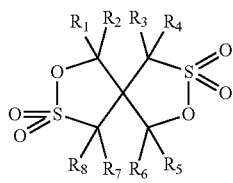

Formula 6

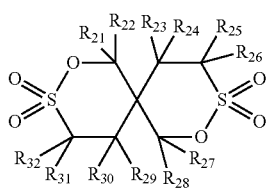

wherein $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently selected from a hydrogen; a halogen; a halogen-substituted or unsubstituted C1 to C5 alkyl group; a halogen-substituted or unsubstituted C5 to C10 aryl group; or a halogen-substituted or unsubstituted C2 to C10 heteroaryl group.

6. The organic electrolytic solution of claim 5, wherein $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently selected from a group consisting of a hydrogen, F, CL, Br, I, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrolyl group, and a pyridinyl group.

7. The organic electrolytic solution of claim 1, wherein the disultone-based compound is represented by one of Formulae 7 to 14:

Formula 7

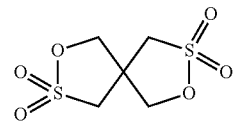

Formula 8

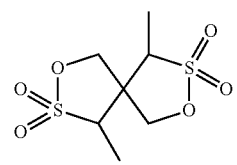

Formula 9

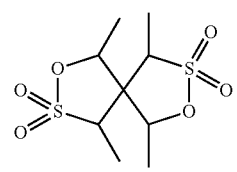

Formula 10

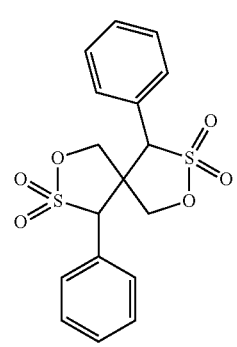

Formula 11

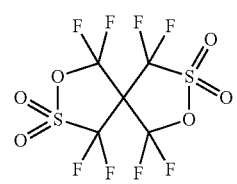

Formula 12

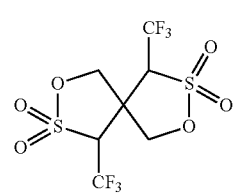

Formula 13

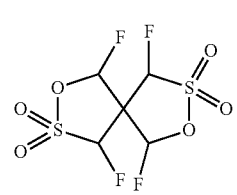

-continued

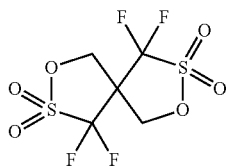
Formula 14

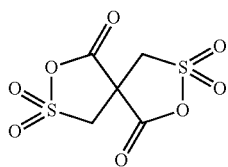
Formula 15

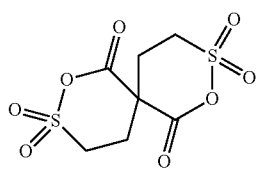
Formula 16

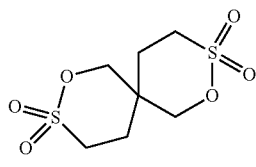
Formula 17

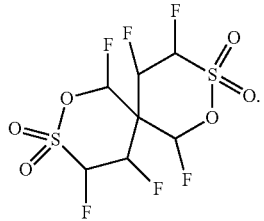
Formula 18

8. The organic electrolytic solution of claim 1, wherein the silicon-based compound is represented by one of Formulae 19 to 21:

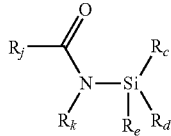
Formula 19

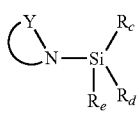
Formula 20

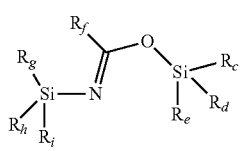
Formula 21 wherein,

Y is a covalent bond or a carbonyl group,

is a N atom-containing C2 to C5 aliphatic ring or aromatic ring, $R_j$ and $R_k$ are each independently selected from a hydrogen; a halogen-substituted or unsubstituted C1 to 5 alkyl group; or a halogen-substituted or unsubstituted C1 to 5 aryl group;

$R_g$, $R_h$, and $R_i$ are each independently selected from a halogen-substituted or unsubstituted C1 to C5 alkyl group; or a halogen-substituted or unsubstituted C1 to C5 aryl group; and $R_c$, $R_d$, $R_e$, and $R_f$ are each independently selected from a hydrogen; a halogen-substituted or unsubstituted C1 to C5 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C5 alkenyl group; or a halogen-substituted or unsubstituted C2 to C5 alkynyl group.

9. The organic electrolytic solution of claim 1, wherein the silicon-based compound is represented by one of Formulae 22 to 31:

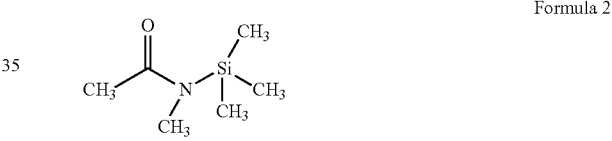
Formula 2

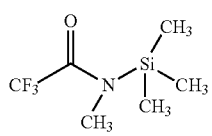
Formula 23

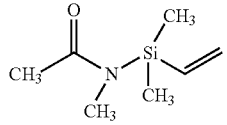
Formula 24

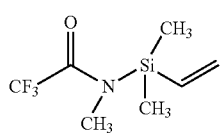
Formula 25

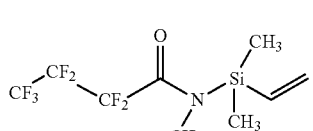
Formula 26

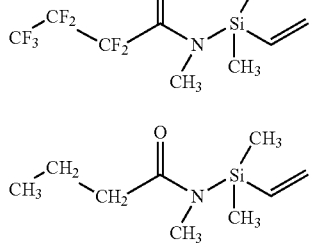
Formula 27

-continued

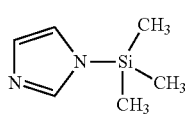
Formula 28

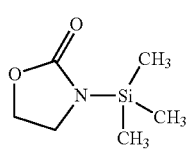
Formula 29

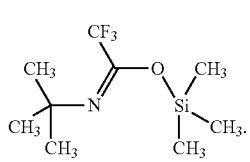
Formula 30

Formula 31

10. The organic electrolytic solution of claim 1, wherein an amount of the disultone-based compound is in a range of about 0.01 wt % to about 10 wt % based on a total weight of the organic electrolytic solution.

11. The organic electrolytic solution of claim 1, wherein an amount of the silicon-based compound is in a range of about 0.01 wt % to about 5 wt % based on a total weight of the organic electrolytic solution.

12. The organic electrolytic solution of claim 1, wherein the organic solvent comprises at least one selected from the group consisting of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile (SN), dimethylsulfoxide, dimethylformamide, dimethylacetamide, gamma-valerolactone, gamma-butyrolactone, and tetrahydrofuran.

13. The organic electrolytic solution of claim 1, wherein the lithium salt has a concentration of about 0.01 M to about 5.0 M.

14. A lithium battery comprising:
a cathode; an anode; and
an organic electrolytic solution wherein, the organic electrolytic solution comprises:
a lithium salt;
an organic solvent;
a disultone-based compound represented by Formula 1; and
a silicon-based compound represented by Formula 2:

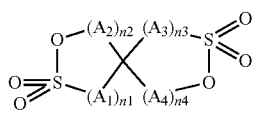
Formula 1

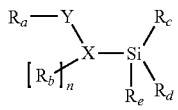
Formula 2 wherein in Formulae 1 and 2,
$A_1$, $A_2$, $A_3$, and $A_4$ are each independently selected from a substituted or unsubstituted C1 to C5 alkyl group; a carbonyl group; or a sulfinyl group,
n1 to n4 are each independently an integer from 1 to 3, when each of n1 to n4 is 2 or more, a plurality of $A_1$, $A_2$, $A_3$, or $A_4$ are identical or different,
X is N or O, and n is 0 or 1, when X is O, n is 0,
Y is a covalent bond, a carbonyl group, or —N=C($R_f$)—,
$R_a$ and $R_b$ are each independently selected from a hydrogen; a halogen-substituted or unsubstituted C1 to C5 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C5 alkenyl group; a halogen-substituted or unsubstituted C2 to C5 alkynyl group; a halogen-substituted or unsubstituted C1 to C5 alkoxy group; a halogen-substituted or unsubstituted C1 to C5 alkylamine group; or —Si($R_g$)($R_h$)($R_i$), wherein $R_g$, Rh, and $R_i$ each are independently a halogen-substituted or unsubstituted C1 to C5 alkyl group,
$R_c$, $R_d$, $R_e$, and $R_f$ are each independently selected from a hydrogen; a halogen-substituted or unsubstituted C1 to C5 alkyl group; a halogen-substituted or unsubstituted C4 to C10 cycloalkyl group; a halogen-substituted or unsubstituted C5 to C10 aryl group; a halogen-substituted or unsubstituted C2 to C10 heteroaryl group; a halogen-substituted or unsubstituted C2 to C5 alkenyl group; or a halogen-substituted or unsubstituted C2 to C5 alkynyl group, and
$R_a$ and $R_b$ link to each other to form a ring.

15. The lithium battery of claim 14:
wherein the disultone-based compound is selected from the group consisting of compounds represented by Formulae 7 to 14:

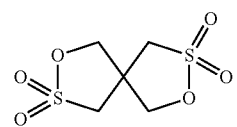
Formula 7

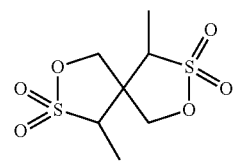
Formula 8

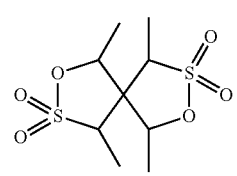
Formula 9

-continued
Formula 10
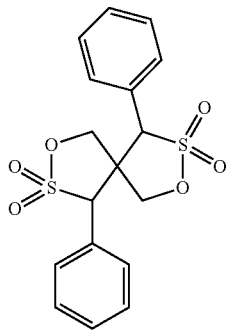
Formula 11
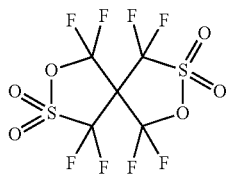
Formula 12
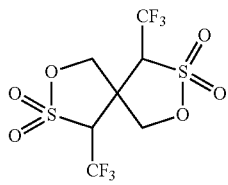
Formula 13
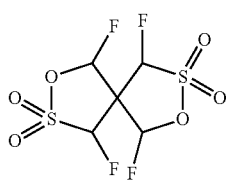
Formula 14
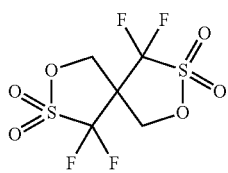
Formula 15
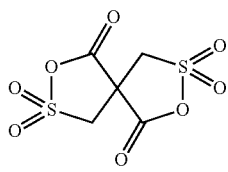
Formula 16
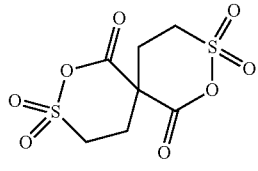
Formula 17
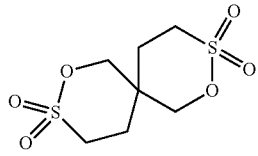
Formula 18
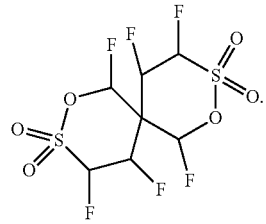
16. The lithium battery of claim 14:
wherein the silicon-based compound is selected from the group consisting of compounds represented by Formulae 22 to 31:
Formula 22
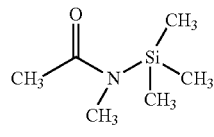
Formula 23
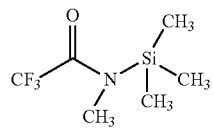
Formula 24
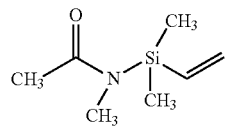
Formula 25
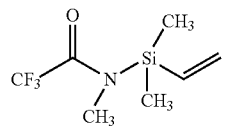
Formula 26
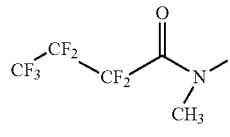
Formula 27
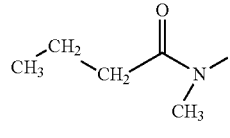
Formula 28
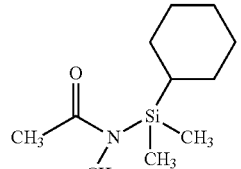
Formula 29
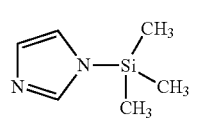

-continued

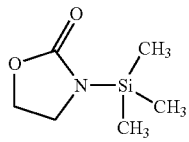
Formula 30

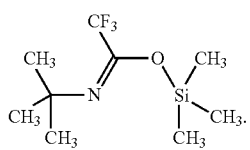
Formula 31

17. The lithium battery of claim 14:
wherein an amount of the disultone-based compound is in a range of about 0.01 wt % to about 10 wt % based on a total weight of the organic electrolytic solution.

18. The lithium battery of claim 14:
wherein an amount of the silicon-based compound is in a range of about 0.01 wt % to about 5 wt % based on a total weight of the organic electrolytic solution.

19. The lithium battery of claim 14:
wherein the organic solvent comprises at least one selected from the group consisting of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile (SN), dimethylsulfoxide, dimethylformamide, dimethylacetamide, gamma-valerolactone, gamma-butyrolactone, and tetrahydrofuran.

20. The lithium battery of claim 14:
wherein the lithium salt has a concentration of about 0.01 M to about 5.0 M.

* * * * *